Nov. 29, 1960 J. M. PRINCE 2,961,755
TOOL FOR ATTACHING A GROMMET TO A SUPPORT
Original Filed Jan. 17, 1955

INVENTOR.
JOHN M. PRINCE 2,961,755
Patented Nov. 29, 1960

2,961,755
TOOL FOR ATTACHING A GROMMET TO A SUPPORT

John M. Prince, Gary, Ind., assignor, by mesne assignments, to The Anderson Company, a corporation of Indiana Original application Jan. 17, 1955, Ser. No. 482,334, now Patent No. 2,759,255, dated Aug. 21, 1956. Divided and this application June 28, 1956, Ser. No. 594,566

4 Claims. (Cl. 29—235)

The invention is directed to a unique tool or holder for inserting grommetlike items in the opening of a support.

One method currently being used to fasten grommets in place merely consists in manually pinching or contracting one end of the grommet and forcing it into the opening and then releasing the contracted end so it can expand or substantially return to its original shape. This conventional method has not proven entirely satisfactory because it is tiring and a time consuming job for any operator to compress and insert the grommets. Moreover, in some instances, the grommets are difficult to insert in the opening and the fingers of an operator are frequently injured by constant use or are cut on sharp edges defining the opening in the support.

With the foregoing in mind, an important object of the invention is to provide a novel and efficient tool whereby the disadvantages inherent in the conventional method above described are overcome.

More particularly, the tool offers a method whereby a holder, carrying a grommet having axially spaced abutments, can be inserted into an opening in a support to compress or otherwise distort one of the abutments to permit passage of the grommet into the opening from one side of the support until the other abutment engages the support whereupon further movement of the holder through the opening to the opposite side of the support will release the holder from the grommet and allow the compressed abutment to automatically return substantially to its former shape to engage the opposite side of the support to lock the grommet in place with the support located between the abutments.

The holder or tool embodying the invention includes a handle at one extremity to facilitate manipulation of the tool and yieldable receiving means at or adjacent its other extremity to form a socket for detachably retaining a grommet therein in a manner whereby the holder may be readily released from the grommet after the grommet has been piloted or directed into the opening and is seated by the holder. The socket or receiving means for the grommet may be designed and constructed in various ways, but as exemplified in the drawing preferably includes a plurality of elongate resiliently flexible fingers or jaw members which are normally spaced apart farther at their free ends than adjacent their inner ends. The inner side of the free end of each finger is preferably notched and these notches form the receiving means or socket. The fingers and socket are so constructed that a grommet can be easily inserted into the socket prior to its entry into the opening of the support and also afford a prompt release of the holder from the grommet after the grommet is properly seated in the opening.

A further object of the invention is to provide a holder which will accommodate, within practicable limits, grommets of variable cross-sectional dimensions or sizes.

Additional objects and advantages of the invention will appear after the description hereinafter set forth is considered in conjunction with the drawings annexed hereto.

Figure 1:
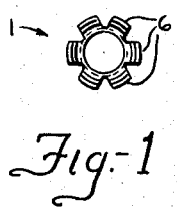
Figure 1 is a top end view of the tool or holder.

This application is a division of my copending application Serial No. 482,334, filed January 17, 1955, now Patent No. 2,759,255.

Referring more particularly to the drawing, numeral 1 generally designates the holder or tool, 2 the grommet and 3 is the support provided with an opening 4 which is adapted to receive the grommet when the holder is passed through the opening.

The holder may be designed and constructed in various ways but, as exemplified in the drawings, is preferably made in the form of a cylindrical tube having corresponding longitudinal slots of a length to provide corresponding longitudinally extending resiliently flexible fingers or jaw members 5 at one extremity of the holder. The opposite extremity of the holder constitutes a handle 6 to facilitate manipulation of the holder.

Figure 3:
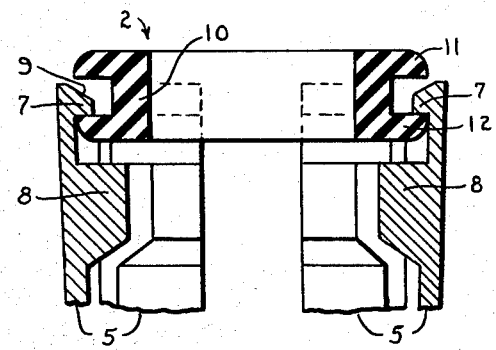
Figure 3 is an enlarged partial sectional view in elevation of the holder and a grommet carried thereby.
Figure 2:
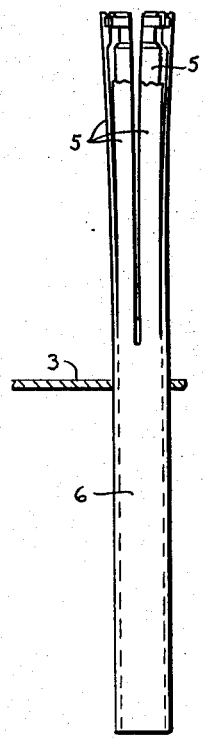
Figure 2 is an elevational view of the holder shown in Figure 1 with portions broken away.

The holder is preferably made so that the fingers or members 5 are outturned or disposed in a diverging relationship as illustrated in Figures 2 and 3. In other words, the extremity provided with the fingers is generally in the form of a tapered cylinder, the free end of which is somewhat larger in cross-dimension than at any other location spaced longitudinally inward therefrom.

Each finger adjacent its free end is preferably provided with an internal abutment 7 and an internal abutment 8 spaced longitudinally inward and of a greater radial extent than abutment 7 to form with the abutment 8 a recess. The recesses in combination provide a yieldable or resiliently flexible receiving means or socket for the grommet as clearly exemplified in Figures 3 and 4 of the drawing. Otherwise expressed, each of the fingers is provided with a notch defined by a pair of axially spaced radial surfaces and an axial surface. It will be noted that each of the abutments 7 is tapered as indicated at 9 to assist in piloting a grommet into the socket. In other words, the tapers assist in slightly camming the fingers outwardly while the grommet is being inserted into the socket. The grommet may be slightly compressed during insertion into the socket and may be gripped or placed under compression when properly carried by the holder as shown in Figure 3, prior to connection with the support 3. The abutments 8 are desirable and may serve to limit movement of the grommet into the socket but may be eliminated, in which event the abutments 7 will serve this purpose.

The type or kind of grommet preferably adapted for use with the holder is generally cylindrical and tubular and provided with an exterior groove to form a neck 10 and a pair of corresponding axially spaced-apart ends or abutments 11 and 12 between which the abutments 7 on the fingers are located when the grommet is disposed in the holder. Attention is directed to the fact that the diameter of a portion of the holder and the diameters of the neck and opening are more or less the same so that the fingers 5 will move radially inward when the holder is passed through the opening and the grommet will properly fit in the opening of the support. It is to be understood that the method and holder can be utilized to assemble grommets of different kinds, shapes and sizes with a support.

Figure 4:
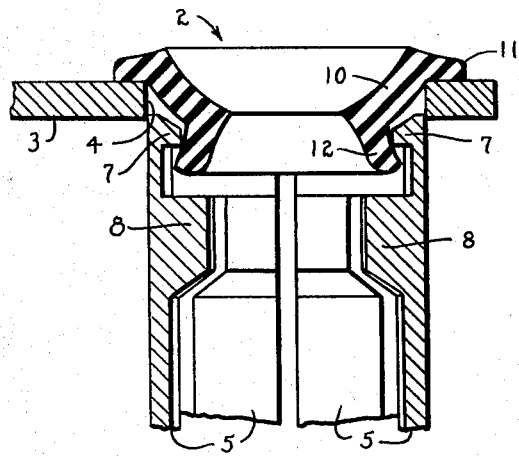
Figure 4 is a view similar to Figure 3 showing the position of the holder and grommet as they are being threaded or passed into the opening of the support.
Figure 5:
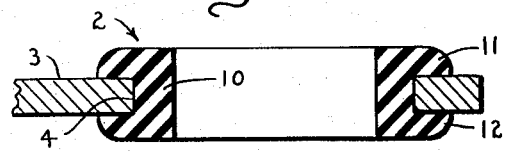
Figure 5 is an elevational view with the grommet in section seated in the support.

The method of assembling or transferring the grommet on the holder to the support is novel and expeditious and is readily accomplished by merely inserting the handle 6 of the holder into the opening 4 and threading or passing the holder through the opening 4 which is of a size to cam or urge the fingers inwardly to distort or compress the end 12 of the grommet and as the opposite end 11 of the grommet engages the upper side of the support as shown in Figure 4 to prevent the grommet from being carried entirely through the opening, the holder will direct the end 12 of the grommet to the underside of the support and clear the opening so that the fingers are free to flex outwardly and facilitate detachment of the holder from the grommet, whereupon the end 12 will automatically return to its original shape or flip into engagement with the underside of the support with the support disposed between the ends 11 and 12 of the grommet to interlock the grommet and support as shown in Figure 5. This method has proven to be very efficient, practical and expeditious in use and only one fast stroke of the holder through the support is required to transfer the grommet from the holder into connection with the support.

Having thus described my invention, it is obvious that various modifications may be made in the same without departing from the spirit of the invention; and, therefore, I do not wish to be understood as limiting myself to the exact form, construction, arrangement, and combination of parts herein shown and described.

I claim:

1. A tool for fastening a grommet in an opening provided in a support, said tool being of a size for complete passage through the opening and comprising an elongate member having a handle at one end and a socket at its other end, said socket comprising a plurality of elongate yieldable members, each of said members having a pair of axially spaced internal radial abutments forming a recess for receiving a portion of a grommet, one of said abutments on each member being of a greater radial extent than the other to limit inward movement of a grommet, and the other abutment on each member being provided with a surface which serves to pilot a grommet into the socket and spread the members so they will accommodate the grommet.

2. A tool of the kind described comprising an elongate member having a handle at one end and a socket at its other end, said handle end being of a size for entry through an opening of a support in advance of the socket, said socket comprising a plurality of elongate yieldable members arranged circumferentially and in a normal diverging relationship, each of said members having a pair of axially spaced internal nonbendable radial abutments forming a recess for receiving a portion of a grommet, one of said abutments on each member being of a greater radial extent than the other to limit inward movement of a grommet, the other abutment on each member being provided for a surface which serves to pilot a grommet into the socket and spread the members apart so they will accommodate and grip the grommet, and said members being contractible to a cross-dimension less than their normal cross-dimension.

3. A tool of the kind described comprising a single elongate body constructed from a cylindrical rod, said body having a handle at one extremity somewhat smaller in cross-dimension than the cross-dimension of the remainder of the rod and a plurality of longitudinal yieldable portions at its other extremity, each of said portions being provided with a first internal radial abutment adjacent its free end and a second internal radial abutment spaced axially inward from the first abutment to form a notch, said notches being disposed to provide a socket for a grommet, and said first abutments being provided with surfaces serving to pilot the grommet over the first abutments into the socket.

4. A tool of the kind described comprising a single elongate body, said body having a handle at one extremity and a plurality of longitudinal yieldable portions at its other extremity, each of said portions being provided with a first internal radial abutment adjacent its free end and a second internal radial abutment spaced axially inward from the first abutment to form a notch, said notches being disposed to provide a socket for a grommet, said handle having a cross-dimension somewhat less than the cross-dimension of the socket so that the handle can be inserted through an opening in which the grommet is to be secured, said second abutment being of a greater radial extent than the first abutment and serving to limit inward axial movement of a grommet, and said first abutments being provided with surfaces serving to pilot the grommet over the first abutments into the socket.

References Cited in the file of this patent

UNITED STATES PATENTS

| 626,582 | Whisler | June 6, 1899 |
| 916,026 | Sasseman | Mar. 23, 1909 |
| 1,109,094 | Weckbaugh | Sept. 1, 1914 |
| 1,596,678 | Miller | Aug. 17, 1926 |
| 2,466,952 | Jakubowski | Apr. 12, 1949 |
| 2,468,286 | Behlert | Apr. 26, 1949 |
| 2,657,818 | Mueller | Nov. 3, 1953 |
| 2,759,255 | Prince | Aug. 21, 1956 |

OTHER REFERENCES

Bulletin 84 "High Speed Grommet Inserter," D. B. Rich Mfg. Co., received Apr. 15, 1954.

UNITED STATES PATENT OFFICE
CERTIFICATION OF CORRECTION

Patent No. 2,961,755                      November 29, 1960

John M. Prince

It is hereby certified that error appears in the above numbered patent requiring correction and that the said Letters Patent should read as corrected below.

Column 4, line 4, for "provided for" read -- provided with --.

Signed and sealed this 2nd day of May 1961.

(SEAL)
Attest:

ERNEST W. SWIDER
Attesting Officer

DAVID L. LADD
Commissioner of Patents